United States Patent
Furukawa

(10) Patent No.: US 6,424,808 B2
(45) Date of Patent: Jul. 23, 2002

(54) FOCUS DETECTING DEVICE, AND CAMERA HAVING THE FOCUS DETECTING DEVICE

(75) Inventor: Nobuyuki Furukawa, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/797,992

(22) Filed: Mar. 5, 2001

(30) Foreign Application Priority Data

Mar. 8, 2000 (JP) ........................................ 2000-062781

(51) Int. Cl.⁷ .............................................. G03B 13/36
(52) U.S. Cl. ....................... 396/104; 396/106; 396/129
(58) Field of Search ................................ 396/106, 129, 396/104, 108

(56) References Cited

U.S. PATENT DOCUMENTS 4,592,638 A * 6/1986 Kaneda et al. .............. 396/106

FOREIGN PATENT DOCUMENTS

| JP | 59-195605 | 11/1984 | ............ G02B/7/11 |
| JP | 6-289281 | 10/1994 | ............ G02B/7/28 |

* cited by examiner

Primary Examiner—W. B. Perkey
(74) Attorney, Agent, or Firm—Fitzpatrick, Cella, Harper & Scinto

(57) ABSTRACT

A focus detecting device includes a light receiving device which receives reflection light from an object of focus detection, an auxiliary light device which illuminates the object of focus detection with auxiliary light, and a control circuit which controls an illuminating action of the auxiliary light device and performs focus detection on the basis of a received-light signal output of the light receiving device. While the auxiliary light device is in process of being controlled to illuminate the object of focus detection, the control circuit compares the received-light signal output of the light receiving device with a prescribed value and causes the focus detection being made by controlling the auxiliary light device to stop if the received-light signal output is less than the prescribed value.

26 Claims, 15 Drawing Sheets

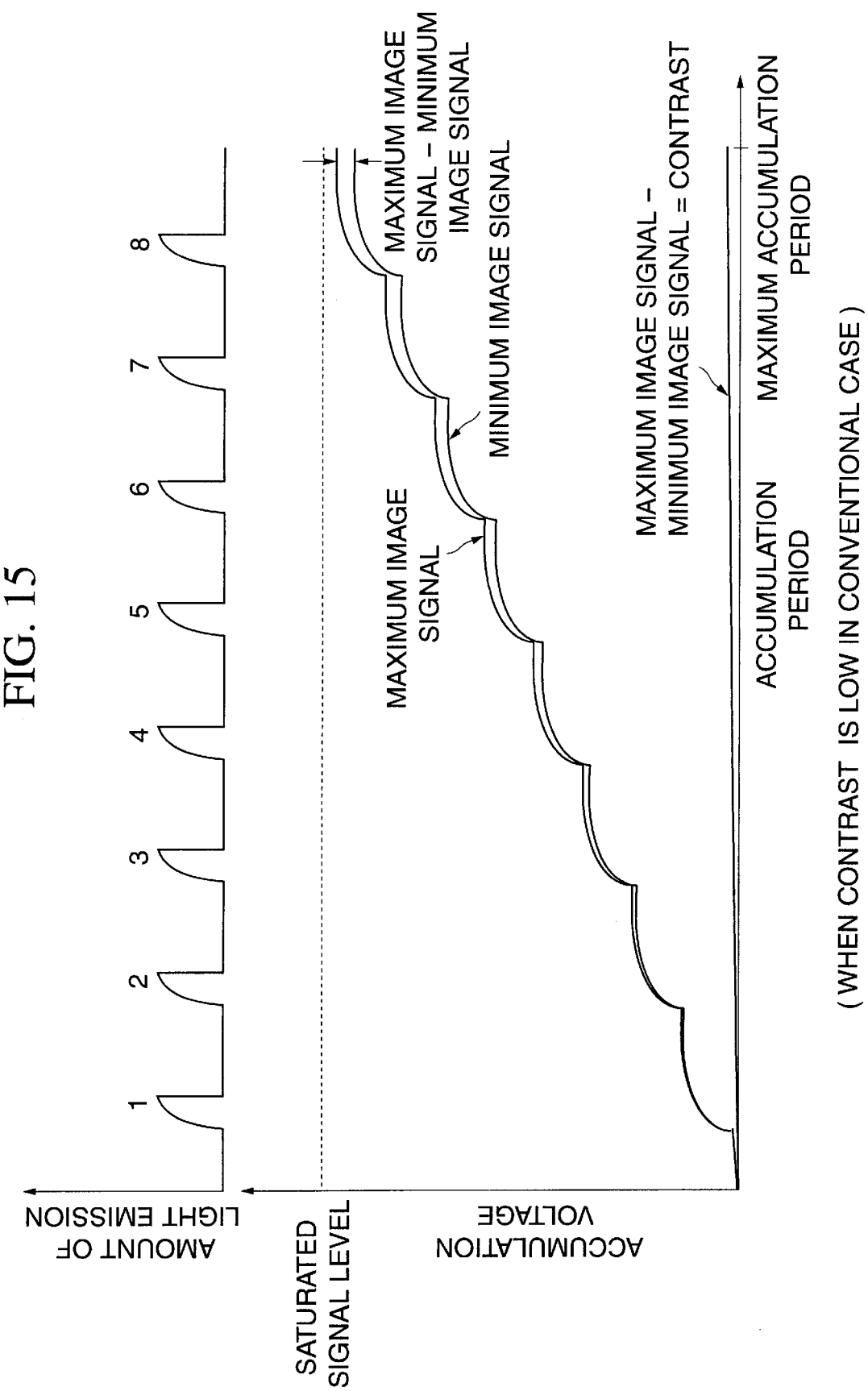

FOCUS DETECTING DEVICE, AND CAMERA HAVING THE FOCUS DETECTING DEVICE

BACKGROUND OF THE INVENTION

1. Field of the Invention

The present invention relates to a focus detecting device arranged to detect focus by illuminating an object of focus detection with an auxiliary light of auxiliary light projecting means and on the basis of an output of light receiving means which receives reflection light from the object, when the object has a low luminance in detecting focus, and also to a camera having the focus detecting device.

2. Description of Related Art

The focus detecting device of a camera or a like phototaking apparatus is arranged to detect focus by leading the light of a photo-taking object incident on an optical system to a light receiving element. The focus detecting device has been variously arranged to detect focus, including a phase-difference (detecting) type. In the case of the phase-difference type, the focus of a camera or the like is detected, for example, on the basis of a phase difference between two optical images which are obtained by splitting incident light of the object into two images.

The phase-difference type focus detecting device is generally arranged to use an integration-type light receiving element. In the focus detecting device of the phase-difference type, the light of the object incident on a photo-taking lens is led to a pair of integration-type light receiving elements arranged in a secondary image forming system. The pair of light receiving elements are linearly arranged to accumulate electric charge according to the amount of incident light and to send out predetermined outputs as signals according to the accumulated electric charge. An arithmetic circuit is arranged to receive the signal outputs and to detect a state of focus (an amount of defocus) by computing a phase difference between the signal outputs. The state of focus thus obtained is used for focus adjustment.

However, in a case where the photo-taking object is dark, the arithmetic circuit is unable to obtain the signals with a sufficient amount of amplitude as the light amount incident on the light receiving elements is small. Under such a condition, focus detection cannot be made by the focus detecting device. To solve the problem, a focus detecting device was disclosed in Japanese Laid-Open Patent Application No. Sho 59-195605. This focus detecting device is arranged to detect whether or not the object of photo-taking has a low luminance and to control the light emitting action of a light emitting device according to the result of detection.

With the focus detecting device arranged in this manner, the focus detecting device performs a focus detecting action on a focus detecting area in accordance with the known phase-difference method.

FIG. 13 shows the state of signals accumulated by the light receiving elements (sensor array) with the flash auxiliary light of a flash device or the like used as the auxiliary light.

Referring to FIG. 13, the amount of light emission increases and an accumulation voltage which is accumulated at the light receiving elements rises as long as the object is illuminated with the flash auxiliary light. A maximum image signal shown in FIG. 13 represents the value of output of a cell which gives the largest image signal output among other cells included in a sensor array which is composed of a plurality of cells. A minimum image signal shown in FIG. 13 represents the output value of a cell which gives the smallest image signal output among other cells included in the sensor array composed of the plurality of sensors. As shown in FIG. 13, both the maximum image signal and the minimum image signal rise every time the illuminating flash light is projected. In the case of FIG. 13, a difference between the maximum image signal and the minimum image signal comes to exceed a predetermined decision value POS when the flash light emission is made for the eighth time, thus indicating that the accumulation of electric charge has come to an end. The decision value POS is a value at which the output image signals are sufficiently obtained to obtain a correlation to be used for a focus detecting arithmetic operation, because the difference between the maximum image signal and the minimum image signal is large enough to give a sufficient image signal amplitude.

However, the amount of auxiliary light emission for illumination is limited. Hence, the conventional art requires further improvement with respect to the following points.

In taking pictures at night, the auxiliary light often fails to reach objects due to far distances, etc.

FIG. 14 shows, for example, a case where the object of photo-taking is located at such a far distance that the flash auxiliary light emitted from the camera hardly can reach the object. In this case, the luminance of the object is low despite the flash auxiliary light emission which is made eight times. Therefore, the value of a signal from the light receiving element indicating a difference between the maximum image signal and the minimum image signal hardly becomes larger. The amplitude of the output image signals is too small to be used for focus detection. Thus, the focus detecting arithmetic operation is hardly possible.

In this respect, a focus detecting arrangement has been developed to increase the amount of auxiliary light emission for illumination in cases where the auxiliary light emission amount is too small, as disclosed in Japanese Laid-Open Patent Application No. Hei 6-289281. However, since there is also a limit to the increase of the amount of light emission, the flash auxiliary light still fails to reach the object in some cases.

FIG. 15 shows another case where the photo-taking object is something like a wall having a uniform reflection factor. In such a case, the focus detecting arithmetic operation cannot be performed as it is impossible to obtain a difference signal indicative of a difference between the maximum image signal and the minimum image signal.

In these cases, the arrangement of the conventional art cited above meaninglessly illuminates the object with the auxiliary light despite the impossibility of focus detection and is thus hardly considered to be efficiently using energy. Besides, the number of cameras of the kind having a built-in flash device and using its flash light as the auxiliary light is increasing these days. Since the electric energy of a battery is rapidly consumed by the built-in flash device, the conventional arrangement of focus detecting devices must be improved also with respect to the service life of the battery.

BRIEF SUMMARY OF THE INVENTION

One aspect of the invention lies in the provision of a focus detecting device having control means arranged to cause an auxiliary light device to illuminate an object of focus detection with auxiliary light, if the luminance of the object of focus detection is low at the time of focus detection, by performing control in the following manner. If the output of a light receiving device for receiving reflection light from the object of focus detection is found to be lower than a prescribed value, the control means stops focus detection being made by controlling the auxiliary light device. Therefore, waste of energy can be minimized by stopping useless illumination in a case where the reflection light cannot be obtained in sufficient amount by illuminating the object of focus detection with the auxiliary light of the auxiliary light device.

Another aspect of the invention lies in the provision of a focus detecting device for a camera, having control means arranged to cause an auxiliary light device to illuminate the object of photo-taking with auxiliary light, if the luminance of the object of photo-taking is low at the time of focus detection, by performing control in the following manner. If the output of a light receiving device for receiving reflection light from the object of photo-taking is found to be lower than a prescribed value, the control means stops focus detection being made by controlling the auxiliary light device. Therefore, waste of energy can be minimized by stopping useless illumination in a case where the reflection light cannot be obtained in sufficient amount by illuminating the object of photo-taking with the auxiliary light of the auxiliary light device.

The above and other objects and features of the invention will become apparent from the following detailed description of preferred embodiments thereof taken in connection with the accompanying drawings.

BRIEF DESCRIPTION OF THE SEVERAL VIEWS OF THE DRAWINGS

FIG. 15 shows a further example of the illumination light amount obtained in illuminating an object with auxiliary light in relation to the output of the conventional focus detecting device.

DETAILED DESCRIPTION OF THE INVENTION

Hereinafter, preferred embodiments of the invention will be described in detail with reference to the drawings.
(First Embodiment)

Figure 1:
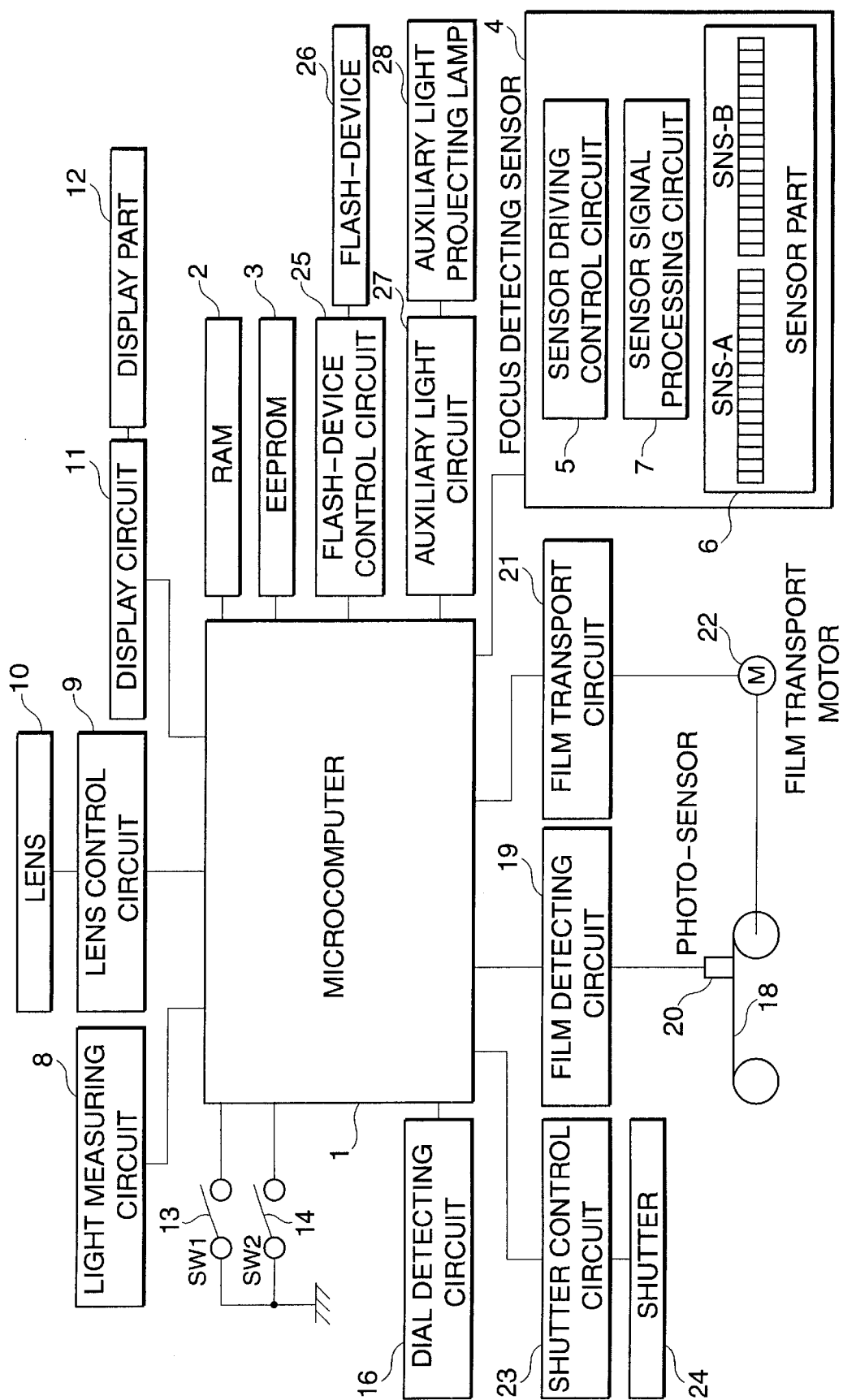
FIG. 1 is a block diagram showing in outline the electrical arrangement of a camera according to a first embodiment of the invention.

FIG. 1 shows in a block diagram the electrical arrangement of a camera according to a first embodiment of the invention. Referring to FIG. 1, a microcomputer 1 is arranged to control the whole camera. A RAM 2 is externally attached to the microcomputer 1. An EEPROM 3, which is a nonvolatile memory, is externally attached to the microcomputer 1. A focus detecting sensor 4 is connected to the microcomputer 1. A sensor driving control circuit 5 is included in the focus detecting sensor 4. A sensor part 6 is arranged within the focus detecting sensor 4 to be driven and controlled by the sensor driving control circuit 5. The sensor part 6 includes a part SNS-A and another part SNS-B each of which is composed of a plurality of sensor cells, and are arranged in pair to form a focus detecting area in one line (hereinafter will be referred to as an AF point). In a case where the camera has a plurality of AF (automatic focusing) points, the focus detecting sensor 4 includes a number of pairs of these parts corresponding to the plurality of AF points. However, for simplification's sake, the first embodiment is described by way of example here on the assumption that the camera has only one AF point. The focus detecting sensor 4 further includes a sensor signal processing circuit 7 which is arranged to perform a signal processing action, according to a signal from the sensor driving control circuit 5, on the signal accumulated at the sensor part 6 and to send the result of the signal processing action to the microcomputer 1.

A light measuring circuit 8 is connected to the microcomputer 1 and is arranged to measure the luminance of a photo-taking object. A lens control circuit 9 is also connected to the microcomputer 1 and is arranged to control an electronic circuit disposed within an interchangeable lens 10 which is detachably mounted on the body of the camera. The interchangeable lens 10, which is connected to the lens control circuit 9 and detachably mounted on the camera body, includes the electronic circuit. The electronic circuit of the interchangeable lens 10 is arranged to control an AF lens in accordance with a control signal coming from the lens control circuit 9. A display circuit 11 is connected to the microcomputer 1 and is provided for displaying a shutter speed, an aperture value, various setting values of the camera, etc. A display part 12 is connected to the display circuit 11 and is arranged to make displays of varied kinds.

A switch 13 (or switch SW1) is connected to the microcomputer 1 for causing the commencement of a light measuring action and a focus detecting action. A switch 14 (or switch SW2) is connected to the microcomputer 1 for the commencement of an exposure. These switches 13 (SW1) and 14 (SW2) are formed into one release switch of the two-step structure. The switch 13 (SW1) is arranged to be turned on by the first stroke of the release switch. The switch 14 (SW2) is arranged to be turned on by the second stroke of the release switch with the switch 13 (SW1) turned on. A dial detecting circuit 16 is connected to the microcomputer 1 and is arranged to detect various setting operations on dials (not shown) which are provided on the camera.

The camera body (not shown) is loaded with a film 18. A film detecting circuit 19 is arranged for detecting the position of the film 18 under the control of the microcomputer 1. A photo-sensor 20 is arranged to be driven by the film detecting circuit 19 to detect the position of the film 18. A film transport circuit 21 is arranged for winding and rewinding the film 18 under the control of the microcomputer 1. A film transport motor 22 is arranged to be controlled and driven by the film transport circuit 21 to transport the film 18.

A shutter control circuit 23 is arranged for control over a shutter 24 for making an exposure under the control of the microcomputer 1. A flash-device control circuit 25 is arranged to control a built-in flash device 26. The flash device 26 is arranged to emit light in an amount according to a control value computed by the flash-device control circuit 25. An auxiliary light circuit 27 is arranged to be caused by the microcomputer 1 to act when the luminance of the object is low at the time of focus detection. An auxiliary light projecting lamp 28 is arranged to be lighted up by the auxiliary light circuit 27. The shape of the auxiliary light projecting lamp 28 varies from camera to camera. In some cases, the auxiliary light projecting lamp 28 is arranged to project light in a pattern. In a case where flash auxiliary light is to be used as the auxiliary light, the built-in flash device 26 is used in place of the auxiliary light projecting lamp 28.

Figure 2:
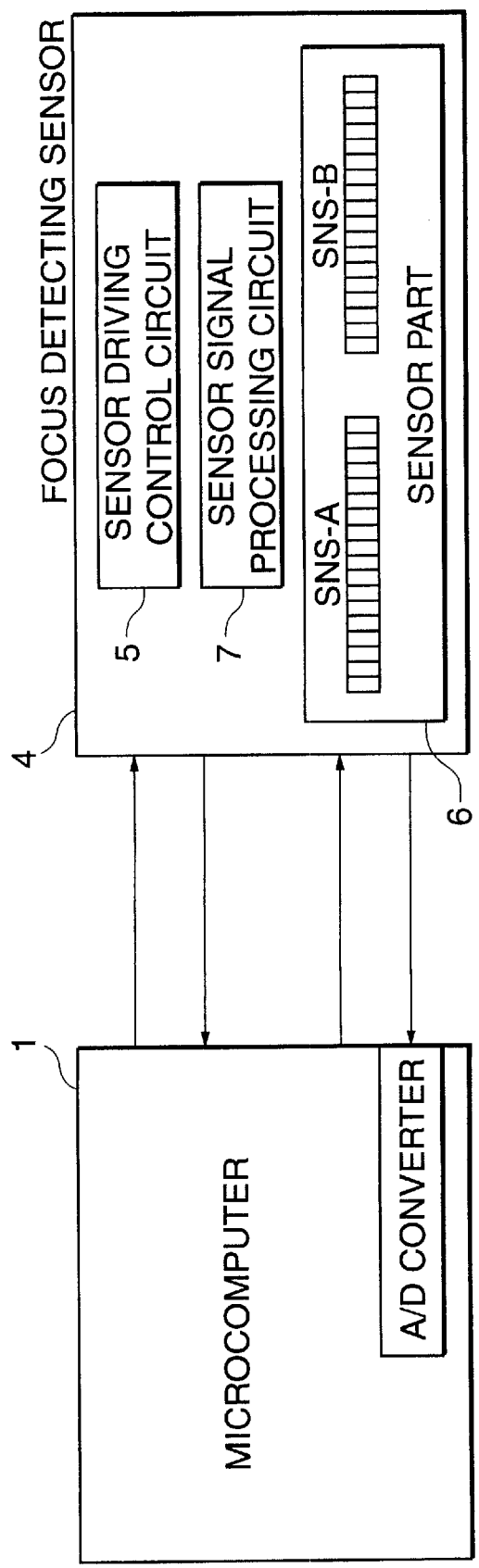
FIG. 2 is a block diagram showing communication to be conducted between a microcomputer and a focus detecting sensor shown in FIG. 1.

FIG. 2 shows the relation of the microcomputer 1 to the focus detecting sensor 4.

Referring to FIG. 2, for control over the focus detecting sensor 4, commands of varied kinds are sent to the focus detecting sensor 4 from the microcomputer 1. On the other hand, the focus detecting sensor 4 is arranged to send information on its state to the microcomputer 1. Further, the focus detecting sensor 4 is arranged to send to the A/D converter of the microcomputer 1, through the sensor signal processing circuit 7, an analog signal which is obtained by processing signals accumulated at the sensor part 6, in accordance with a clock signal received from the microcomputer 1.

Figure 3:
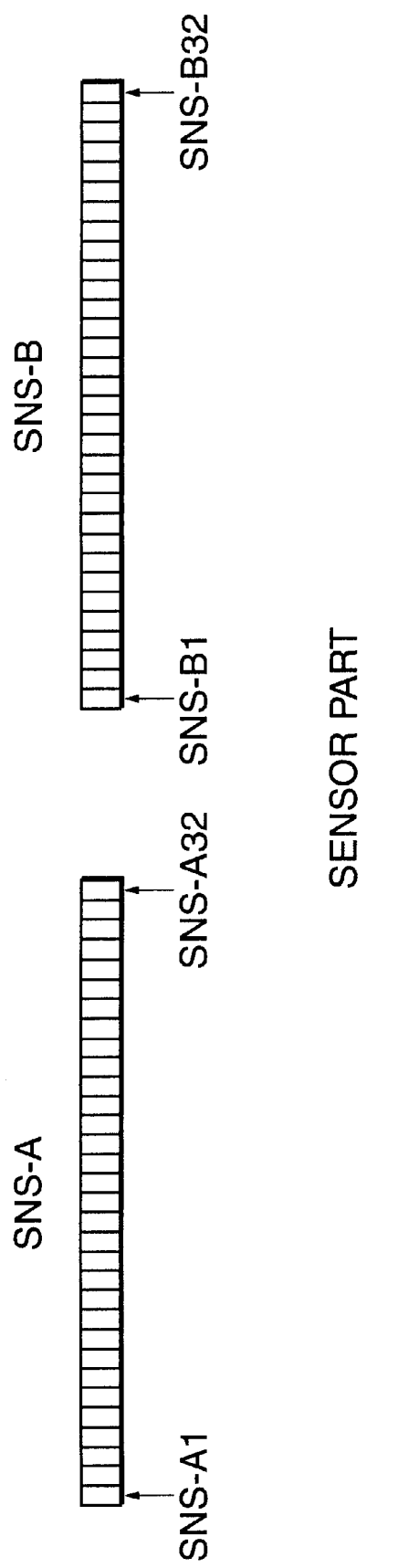
FIG. 3 is a diagram showing sensor cells arranged within the focus detecting sensor shown in FIG. 1.

FIG. 3 shows in detail the arrangement of sensor cells of the sensor part 6 of the focus detecting sensor 4.

As shown in FIG. 3, in the sensor part 6, the sensor cells are laterally aligned in a row composed of the two parts SNS-A and SNS-B for the purpose of carrying out the focus detection in accordance with the known phase difference method. The part SNS-A is composed of a total of 32 sensor cells, i.e., sensor cells SNS-A1 to SNS-A32. The other part SNS-B is also composed of a total of 32 sensor cells, i.e., SNS-B1 to SNS-B32.

Figure 4:
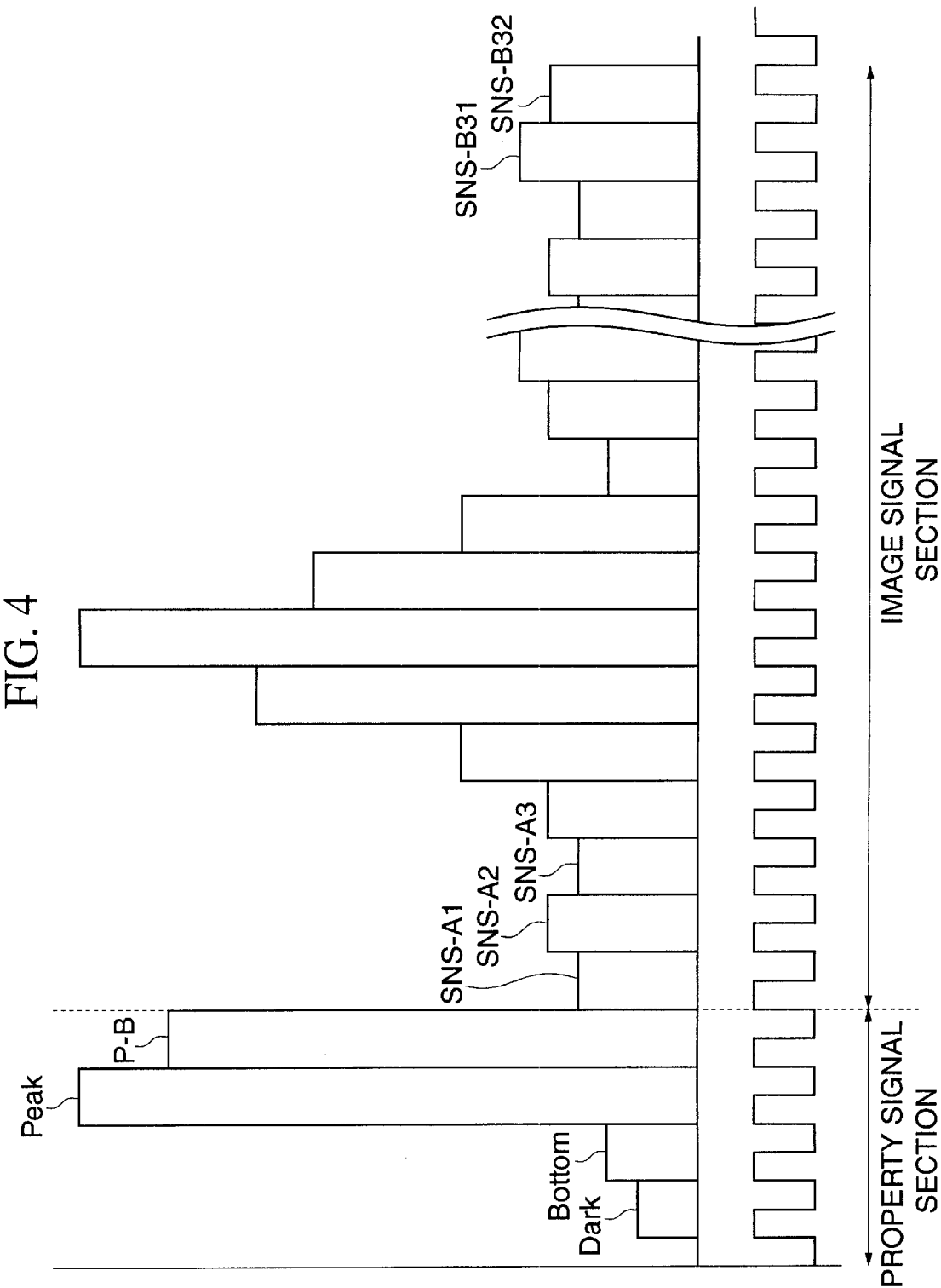
FIG. 4 is a diagram showing the signal output of the focus detecting sensor shown in FIG. 1.

FIG. 4 shows an image signal outputted from the focus detecting sensor 4.

Referring to FIG. 4, the focus detecting sensor 4 outputs an analog image signal in accordance with a reading clock signal outputted from the microcomputer 1. The image signal is composed of a property signal section which indicates the property of the image signal, and an image signal section which corresponds to the actual outputs of the sensor cells.

In the property signal section, a Dark signal which is a signal from such a sensor cell that is blocked from light, a Bottom signal which is a signal from a sensor cell giving the smallest output among the sensor cells SNS-A1 to SNS-B32, a Peak signal which is a signal from a sensor cell giving the largest output among the sensor cells SNS-A1 to SNS-B32, and a P-B signal which indicates a difference value obtained by subtracting the Bottom signal from the Peak signal and thus represents the contrast of the image, are serially outputted in this order.

In the image signal section of the image signal of the focus detecting sensor 4, output signals of the sensor cells SNS-A1 to SNS-B32 are serially outputted.

Figure 5:
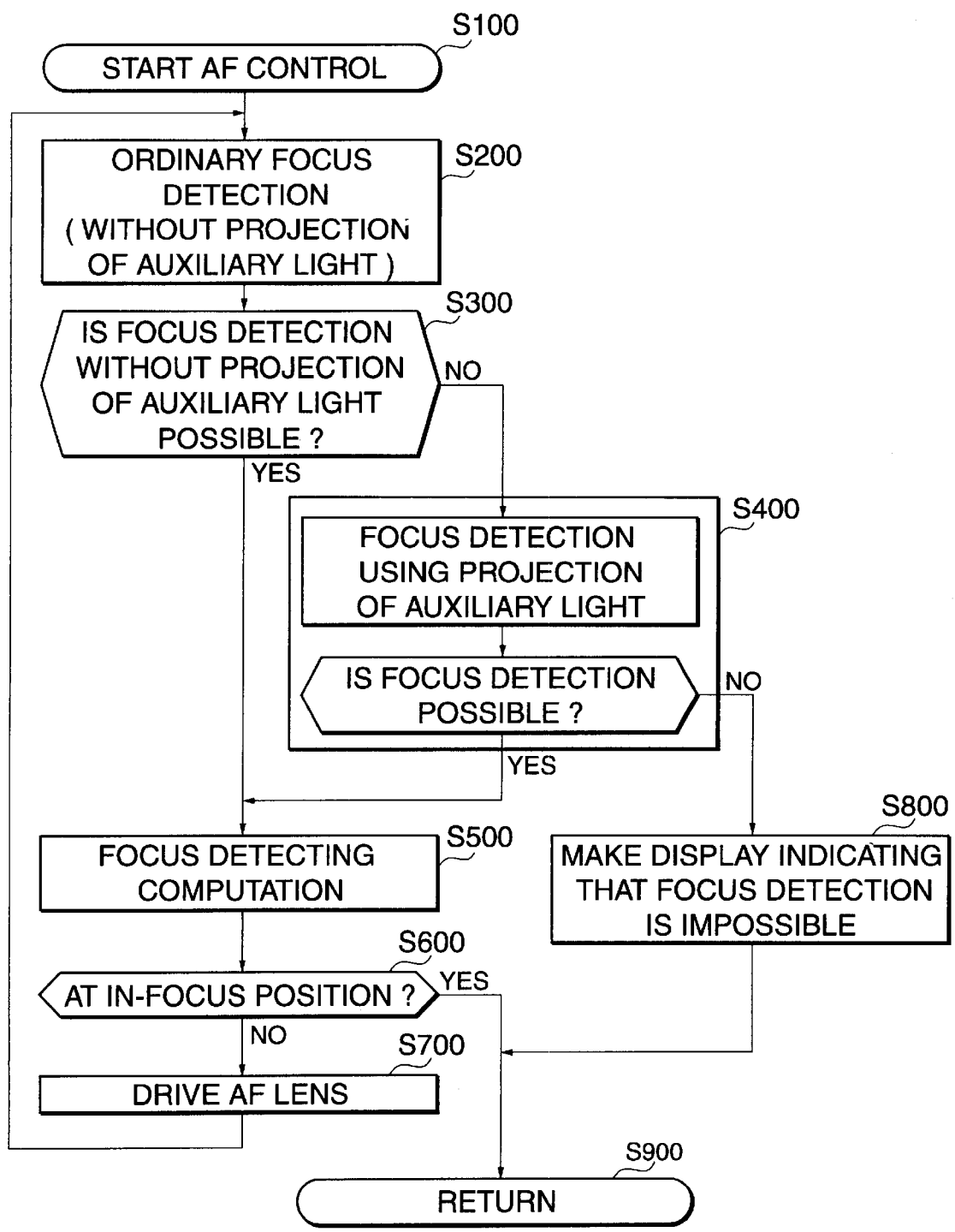
FIG. 5 is a flow chart showing the AF control operation of the camera according to the first embodiment.

FIG. 5 is a flow chart showing in outline a control operation to be performed by the microcomputer 1 in carrying out an AF control by using auxiliary light in a case where a photo-taking object has a low luminance. When the switch 13 (SW1) shown in FIG. 1 turns on, the flow of operation begins at step S100 of FIG. 5. The flow then proceeds from the step S100 to step S200.

At the step S200, a focus detecting process is performed in an ordinary manner without using any auxiliary light to illuminate the object. At the next step S300, a check is made to find if the focus detection has been possible without auxiliary light. If so, the flow proceeds from the step S300 to step S500. If not, the flow proceeds to step S400. At the step S400, a focus detecting process is performed by illuminating the object with auxiliary light in a manner as will be described in detail later with reference to FIG. 6. In a case where the focus detecting process has been possible with the auxiliary light being used, the flow proceeds from the step S400 to the step S500. If the focus detection with the auxiliary light is found at the step S400 to be impossible, the flow proceeds from the step S400 to step S800. At the step S800, the display part 12 is caused through the display circuit 11 to make a display indicating that the focus detection is impossible. The flow then returns to a main routine (not shown).

At the step S500, a focus detecting arithmetic operation is performed to obtain an amount of driving the AF lens, i.e., a defocus amount, by using the signal supplied from the focus detecting sensor 4. At the next step S600, the result of the arithmetic operation performed at the step S500 is examined by comparing the defocus amount with a predetermined value for the necessity of driving the AF lens. If the defocus amount is found to be less than the predetermined value, the AF control process is terminated, and the flow returns to the main routine (not shown). If the defocus amount is found to be larger than the predetermined value, the flow proceeds from the step S600 to step S700. At the step S700, the AF lens is driven on the basis of the result of the arithmetic operation obtained at the step S500. After the step S700, the flow returns to the step S200 to repeat the above-stated steps in the same manner.

Procedures for executing the step S400 of FIG. 5 which is provided for focus detection by illuminating the object of focus detection with auxiliary light are next described referring to the flow chart of FIG. 6 as follows.

In the case of the first embodiment, the auxiliary light is of a flash auxiliary light type using the flash light of the built-in flash device 26 for illuminating the object. However, the invention is not limited to the use of the flash auxiliary light type but applies also to a case where an ordinary lamp or a lamp light having some pattern such as the auxiliary light projecting lamp 28 shown in FIG. 1. Only it must be noted that, while illumination is intermittently made in the case of the flash auxiliary light, the illumination is continuous in a case where the ordinary lamp or the like is used. In the latter case, the concept of use of a counter "i" which is described below is likely replaced with control by time.

Figure 6:
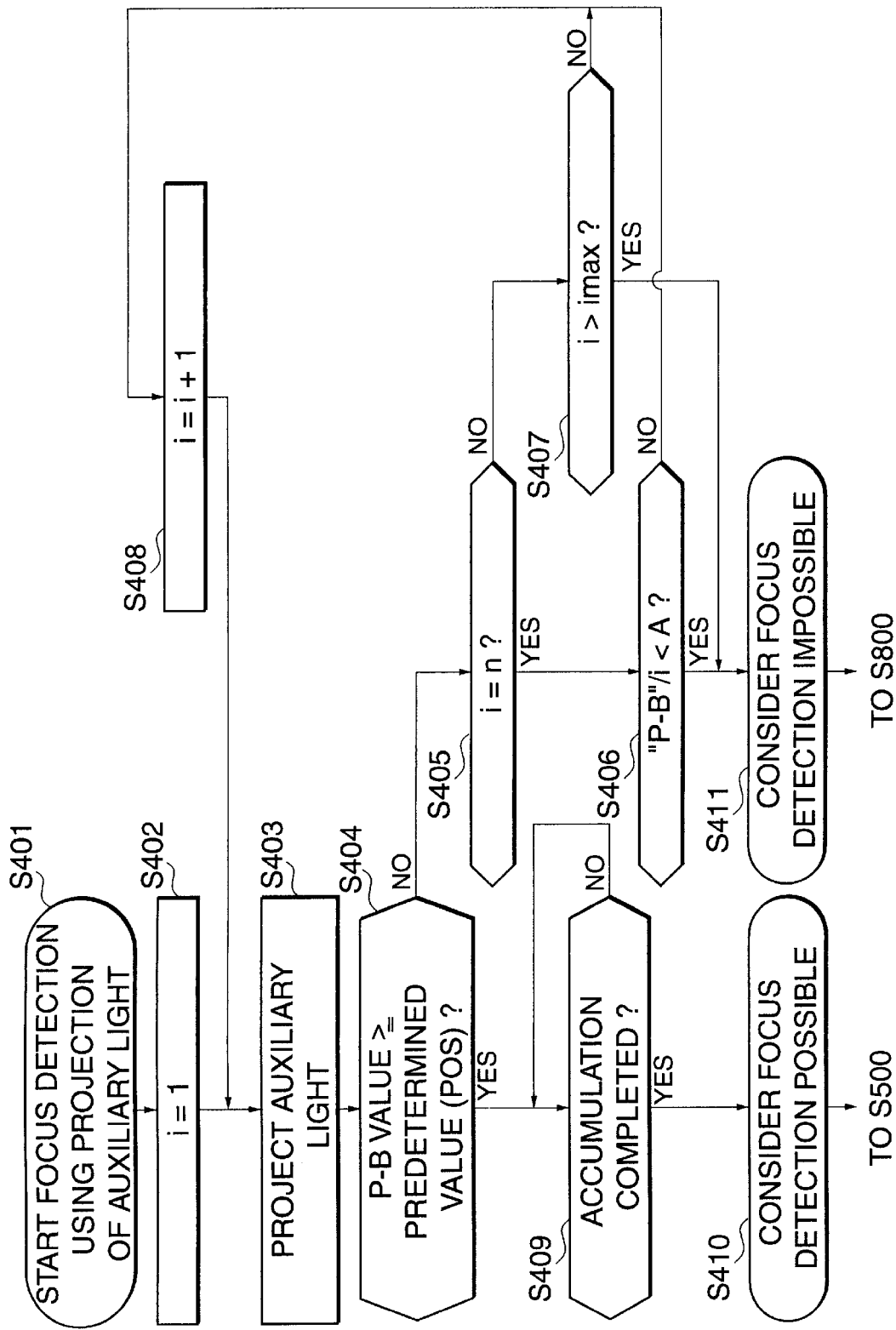
FIG. 6 is a flow chart showing the details of step S400 shown in FIG. 5.

At step S402 of FIG. 6, the counter "i" is set at "1". The counter "i" is arranged to store information on the number of times of illuminating or projecting the flash auxiliary light. At the next step S403, the built-in flash device 26 is driven through the flash-device control circuit 25 to emit flash light toward the object. At step S404, after illuminating the object with the flash light, the P-B signal is read from the focus detecting sensor 4. The P-B value indicated by the P-B signal is checked to find if the P-B value is equal to or larger than the predetermined value POS. If so, the probability that the focus detecting arithmetic operation is possible is sufficiently high and, therefore, the flow proceeds from the step S404 to step S409. If not, the flow proceeds from the step S404 to step S405.

At the step S405, a check is made to find if the count value of the counter "i" has reached a predetermined number of times "n". If so, the flow proceeds to step S406. If not, the flow proceeds from the step S405 to step S407. At the step S406, a value obtained by dividing the P-B value by the count value "i" is compared with a halfway decision value A. If the value is found to be less than the halfway decision value A, focus detection is decided to be impossible, and the flow proceeds to step S411 to stop the auxiliary light from being projected. If the value obtained by dividing the P-B value by the count value "i" is found to be equal to or larger than the value A, there still remains the possibility of the focus detecting arithmetic operation and, therefore, the flow proceeds from the step S406 to step S408 to continue illuminating the object with the flash auxiliary light. At the step S408, the count value of the counter "i" is incremented by one (1). With regard to the halfway decision value A, it is considered to be theoretically adequate to obtain the value A by dividing the predetermined value POS by a prescribed value "imax" that corresponds to the maximum count value of the counter "i". In actuality, however, the value A is decided through experiments by taking into consideration such noises that likely enter the circuits and the focus detecting sensor of the camera.

At the step S407, a check is made to find if the number of times "i" of illuminating with the flash auxiliary light has come to exceed the prescribed value "imax". If so, the flow proceeds from the step S407 to step S411. The result of the check at the step S407 indicates that the P-B signal cannot be obtained in a sufficient amount even by illuminating the object with the auxiliary light the prescribed number of times "imax". Such a result of check is rarely obtained with the flow of operation arranged to compare the P-B value with the predetermined value POS halfway in process of illuminating and to stop illuminating with the auxiliary light according to the result of the halfway check, as in the present embodiment. The step S407 is provided against some unexpected occasion.

In a case where the flow proceeds to the step S409, a check is made for the end of the process of accumulation. If the process is found to be finished thus indicating that the focus detection is possible, the flow proceeds to step S410. At the step S410, since the focus detection is possible, the flow proceeds to the step S500 of FIG. 5. At the step S411, since the focus detection is found to be impossible, the flow is allowed to proceed to the step S800 of FIG. 5 to let the user know that the focus detection is impossible.

Figure 7:
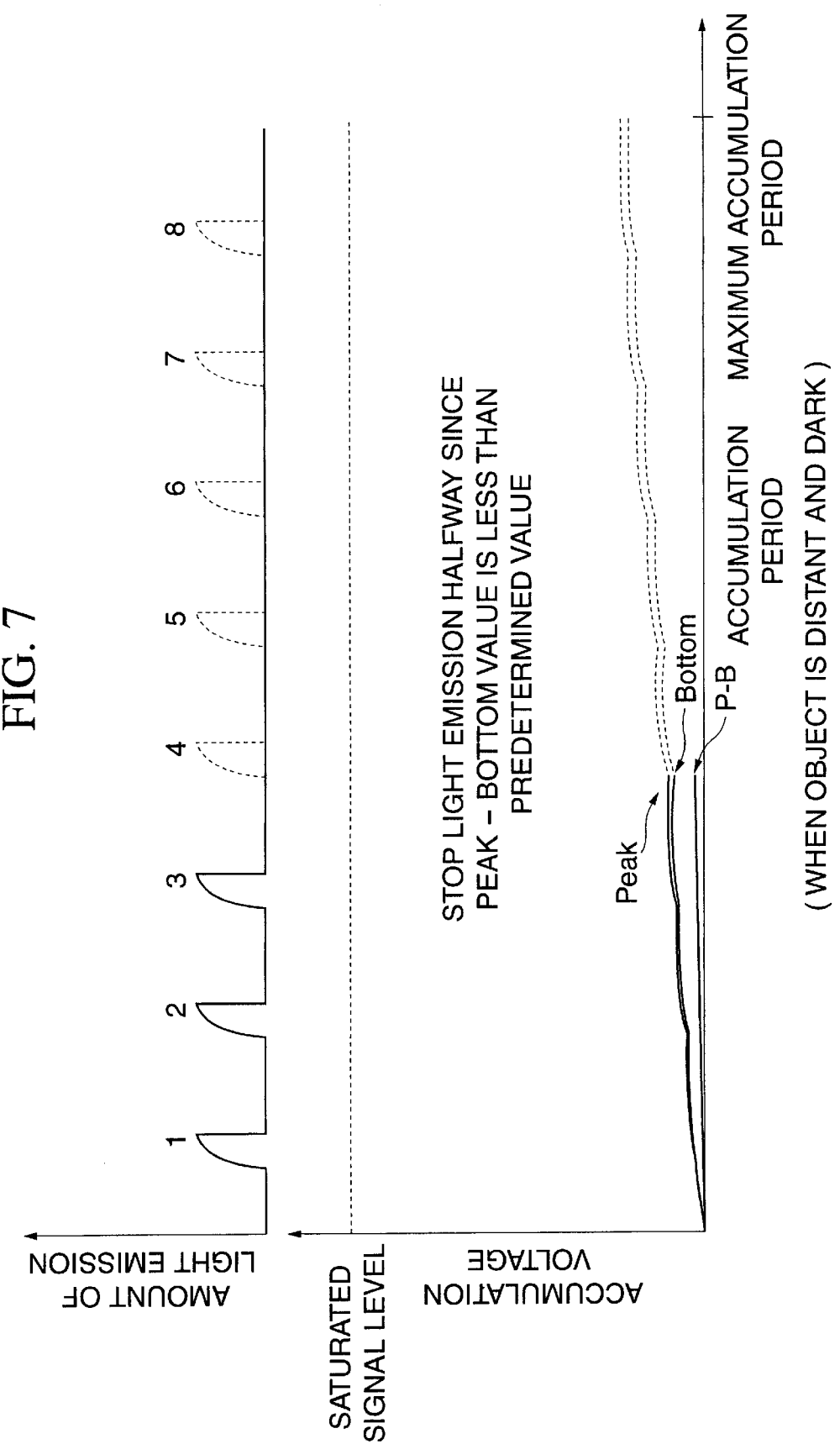
FIG. 7 is a diagram showing by way of example an illumination light amount obtained by illuminating an object with auxiliary light in relation to the output of the focus detecting device in the first embodiment.

FIG. 7 shows a case where illumination with the auxiliary light is stopped halfway as the object of photo-taking is dark and located at a far distance.

The camera described here is arranged to have the prescribed value "imax" which corresponds to the maximum count value of the counter "i" set at "8" and a predetermined number of times "n" of comparing the P-B value with the predetermined value POS set at "3". If the predetermined number of times "n" is at a small value, a great energy saving effect can be attained in the event of stopping the illuminating process halfway, because the decision can be made when the amount of the illuminating light emitted from the built-in flash device 26 is still small. On the other hand, the results of tests indicate that, if the number of times "n" is small, the signal cannot be obtained in sufficient amount for accurate decision due to the adverse effect of noises. Therefore, in designing the camera, the number of times "n" should be decided on the basis of experience according to the purpose for which the camera is adapted.

With the flash auxiliary light emitted three times from the built-in flash device 26, if the P-B value is found at the step S404 to be less than the predetermined value POS, the flow proceeds to the step S405. Then, since i=n, the flow proceeds from the step S405 to the step S406. At the step S406, a value obtained by dividing the P-B signal by the value "i" (3) is compared with the halfway decision value A. If the value is found to be less than the halfway decision value A, it is judged that the P-B signal would not reach the value POS even if the illumination with the auxiliary light is repeated further up to the prescribed number of times "imax" (8). The focus detection is thus decided to be impossible, and the flow proceeds to the step S411 to stop illuminating the object with the auxiliary light any further.

Figure 8:
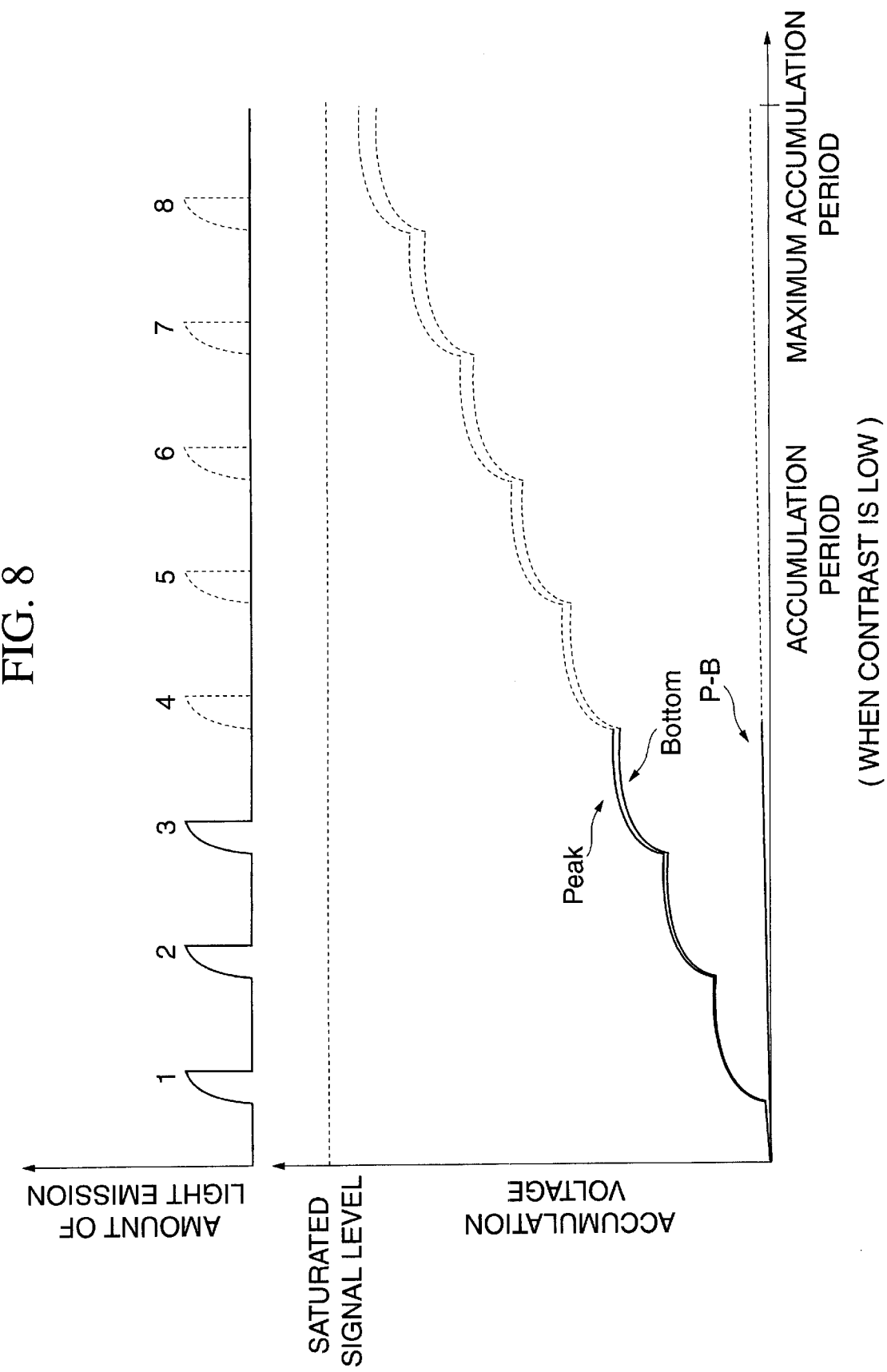
FIG. 8 is a diagram showing another example of the illumination light amount obtained in illuminating an object with the auxiliary light in relation to the output of the focus detecting device in the first embodiment.

FIG. 8 shows a case where the object of photo-taking is something like a wall having a uniform reflection factor. In the case of such an object, even if the object is illuminated with the flash auxiliary light, both the Peak value and the Bottom value would rise alike to make it impossible to obtain a sufficiently large P-B signal. In this case, the flow of operation proceeds from the step S405 to the step S406 when the count value of the counter "i" is at "3". At the step S406, where a check is made for the P-B value, focus detection is judged (decided) to be impossible, because the P-B signal would not reach the predetermined value POS even if the illumination with the auxiliary light is repeated further up to the prescribed number of times "imax" (8). The flow then proceeds from the step S406 to the step S411 to stop illuminating with the auxiliary light any further.

(Second Embodiment)

The following description describes the actions of essential parts of a camera according to a second embodiment of the invention. The structural arrangement of the camera is the same as that of the first embodiment described above.

Figure 9:
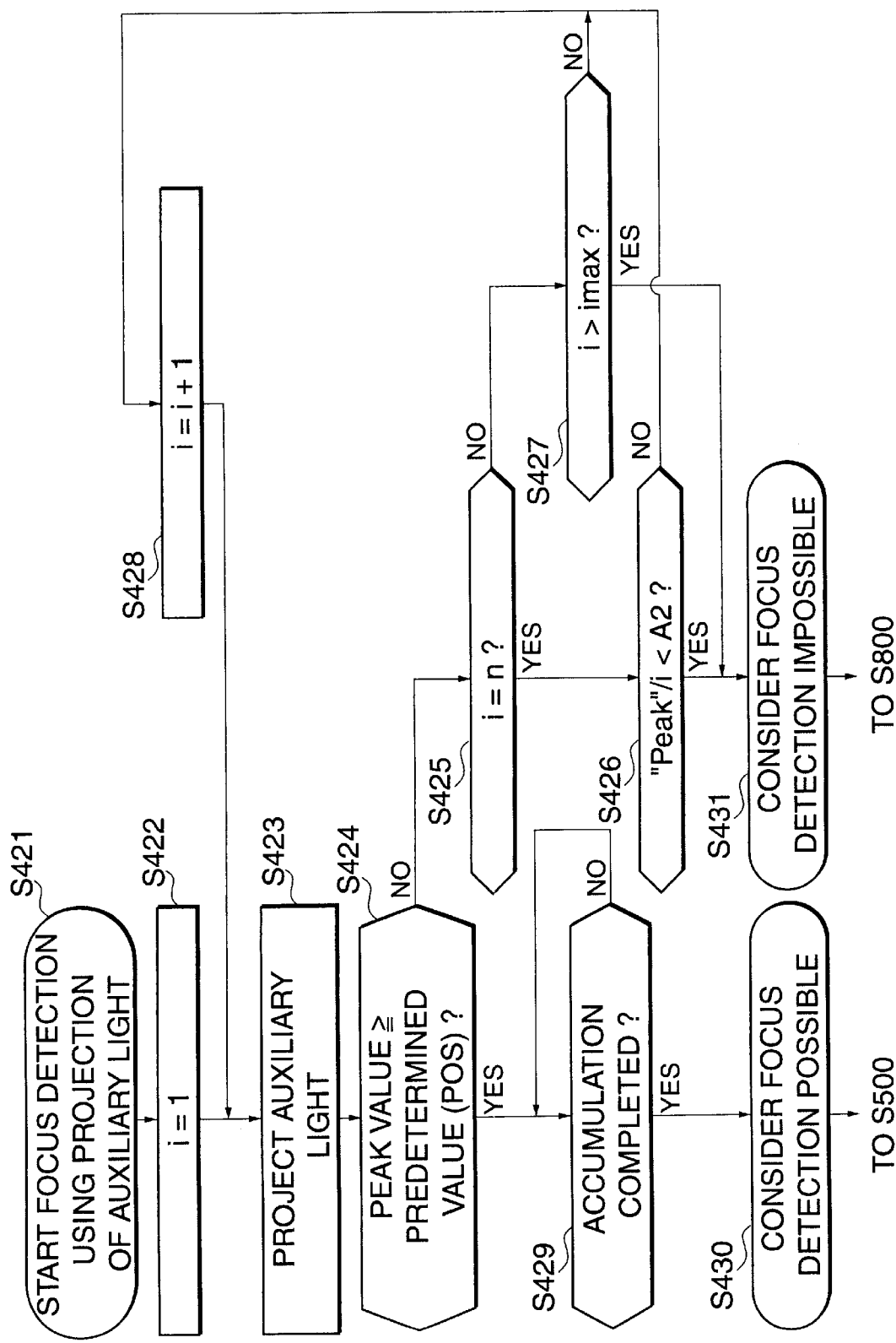
FIG. 9 is a flow chart showing the AF control operation of a camera according to a second embodiment of the invention.

FIG. 9 is a flow chart showing the flow of the AF control operation of the second embodiment performed with auxiliary light being used because of a low luminance of the object of photo-taking. In a case where the auxiliary light used for illuminating the object has a pattern, which herein means light projected in approximately perpendicular stripes with respect to the sensor array, the Bottom value does not rise following the Peak value even in the event of such an object that has a uniform reflection factor like a wall. Therefore, unlike in the case of FIG. 8, the P-B signal can be obtained in a sufficient amount because the Peak value of the signal saliently rises as compared with the Bottom value as long as the auxiliary light reaches the object. Hence, the decision as to the possibility of focus detection can be made by comparing only the Peak signal with the predetermined value POS with the object illuminated with the pattern of auxiliary light. The second embodiment is, therefore, arranged to decide whether the illumination with the auxiliary light should be continued or to be discontinued halfway, by comparing only the Peak signal. With the exception of this point, the second embodiment is arranged in the same manner as the first embodiment. Although the arrangement of the second embodiment is applicable also to the use of flash light as the auxiliary light, the following describes the second embodiment on the assumption that intermittent patterned auxiliary light is used.

When focus detection is decided to be impossible without auxiliary light at the step S300 of FIG. 5, the flow of operation proceeds to step S421 of FIG. 9 to start focus detection with auxiliary light from step S422.

At the step S422, the counter "i" is set at "1". The counter "i" is arranged to store information on the number of times of illuminating or projecting the patterned auxiliary light. At the next step S423, the auxiliary light projecting lamp 28 is driven through the auxiliary light circuit 27 to emit the patterned auxiliary light toward the object. At step S424, after illuminating the object with the patterned auxiliary light, the Peak signal is read from the focus detecting sensor 4. The Peak value which represents the magnitude of the Peak signal is checked to find if the Peak value is equal to or larger than the prescribed value POS. If so, the possibility that the focus detecting arithmetic operation is possible is sufficiently high and, therefore, the flow proceeds from the step S424 to step S429. If not, the flow proceeds from the step S424 to step S425.

At the step S425, a check is made to find if the count value of the counter "i" has reached a predetermined number of times "n". If so, the flow proceeds to step S426. If not, the flow proceeds from the step S425 to step S427. At the step S426, a value obtained by dividing the value of the Peak signal by the count value "i" is compared with a halfway decision value A2. If the value is found to be less than the halfway decision value A2, focus detection is judged to be impossible, and the flow proceeds to step S431 to stop projecting the auxiliary light. If the value obtained by dividing the value of the Peak signal by the count value "i" is found to be equal to or larger than the halfway decision value A2, there still remains some possibility of focus detection and, therefore, the flow proceeds from the step S426 to step S428 to continue illuminating the object with the patterned auxiliary light. At the step S428, the count value of the counter "i" is incremented by one (1). With regard to the halfway decision value A2, it is considered to be theoretically adequate to obtain the halfway decision value A2 by dividing the value POS by a prescribed value "imax" that corresponds to the maximum count value of the counter "i". In actuality, however, the halfway decision value A2 is decided through experiments by taking into consideration such noises that likely enter the circuits and the focus detecting sensor of the camera and also a drift portion of a Dark signal component. Hence, the halfway decision value A2 in the second embodiment is generally larger than the halfway decision value A in the first embodiment.

At the step S427, a check is made to find if the number of times "i" of illuminating with the patterned auxiliary light has come to exceed the prescribed value "imax". If so, the flow proceeds from the step S427 to step S431. The result of the check at the step S427 indicates that the Peak signal cannot be obtained in a sufficient amount even with the object illuminated with the auxiliary light the prescribed number of times "imax". Such a result of check is rarely obtained with the flow of operation arranged to compare the Peak value with the predetermined value POS halfway in process of illuminating and to stop illuminating with the auxiliary light according to the result of the halfway check, as in the second embodiment. However, the step S427 is provided against some unexpected occasion.

In a case where the flow proceeds to the step S429, a check is made for the end of the process of accumulation. If the process is found to be finished thus indicating that the focus detection is possible, the flow proceeds to step S430. At the step S430, since the focus detection is possible, the flow proceeds to the step S500 of FIG. 5. At the step S431, since the focus detection is found to be impossible, the flow is allowed to proceed to the step S800 of FIG. 5 to let the user know that the focus detection is impossible.

Figure 10:
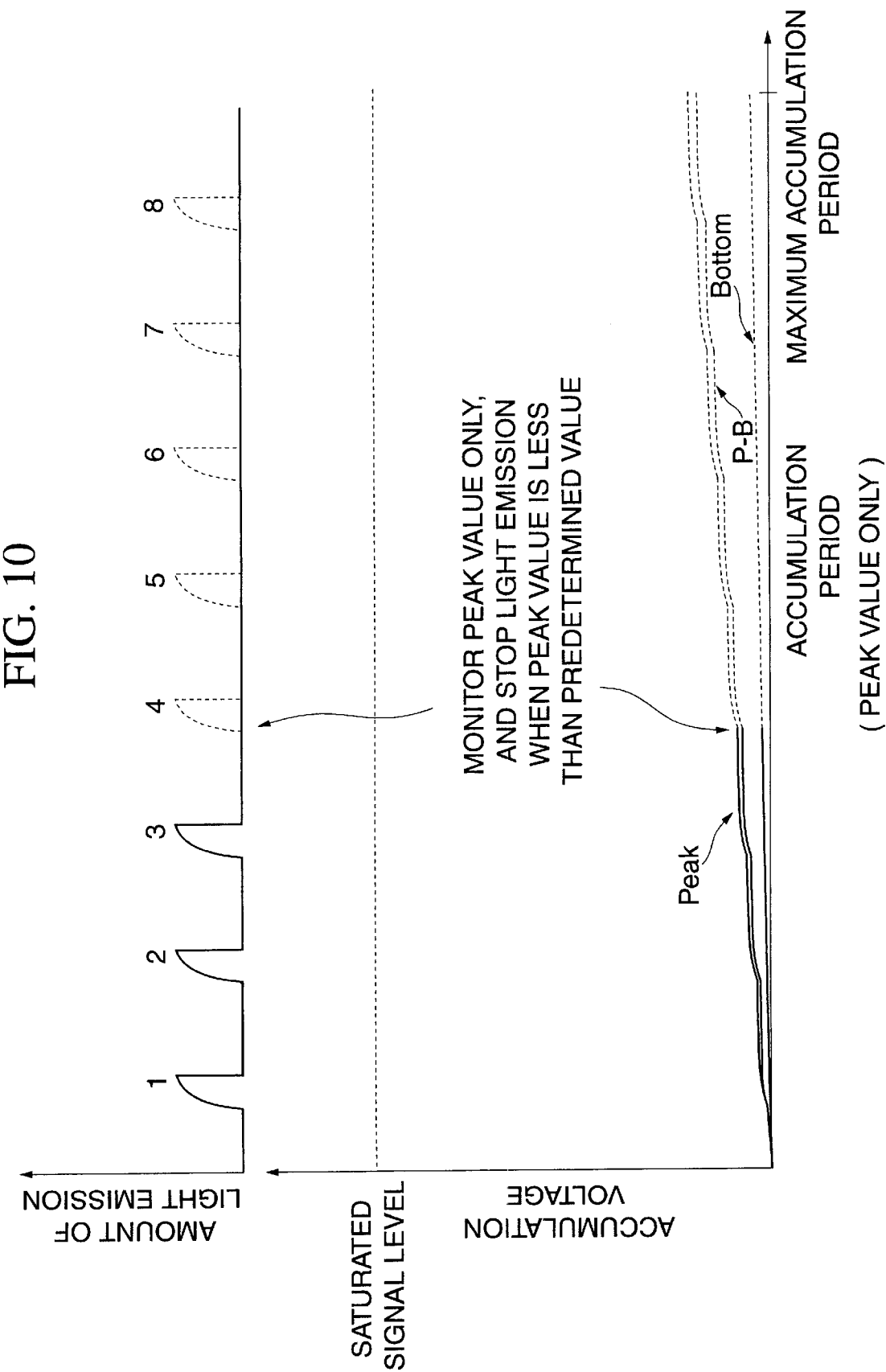
FIG. 10 is a diagram showing by way of example an illumination light amount obtained in illuminating an object with auxiliary light in relation to the output of the focus detecting device in the second embodiment.

FIG. 10 shows a case where illumination with the auxiliary light is stopped halfway as the object of photo-taking is dark and located at a far distance.

The camera described here is arranged to have the prescribed value "imax" which corresponds to the maximum count value of the counter "i" set at "8" while the predetermined number of times "n" of comparing the Peak value with the predetermined value POS is set at "3". If the predetermined number of times "n" is a small value, a great energy saving effect can be attained in the event of stopping the illuminating process halfway, because the decision can be made while the amount of the illuminating light is still small. On the other hand, the results of tests indicate that, if the number of times "n" is small, the signal cannot be obtained in sufficient amount to make accurate decision due to the adverse effect of noises. Therefore, the number of times "n" should be decided on the basis of experience in designing the camera according to the purpose for which the camera is adapted.

With the auxiliary light projected three times, if the Peak value is found at the step S424 to be less than the predetermined value POS, the flow proceeds to the step S425. Then, since i=n, the flow proceeds from the step S425 to the step S426. At the step S426, a value obtained by dividing the Peak signal by the value "i" (3) is compared with the halfway decision value A2. If the value is found to be less than the halfway decision value A2, it is judged that the Peak signal would not reach the value POS even if the illumination with the auxiliary light is repeated further up to the prescribed number of times "imax" (8). The focus detection is thus decided to be impossible, and the flow proceeds to the step S431 to stop illuminating with the auxiliary light any further.

(Third Embodiment)

The first and second embodiments described above are arranged to intermittently project the light of the flash device or the patterned auxiliary light. A third embodiment of the invention is arranged, on the other hand, to continuously project the light of the auxiliary light projecting lamp 28 instead of intermittently projecting the auxiliary light. The circuit arrangement and the AF control of the third embodiment are the same as those of the first embodiment. The third embodiment operates as follows.

Figure 11:
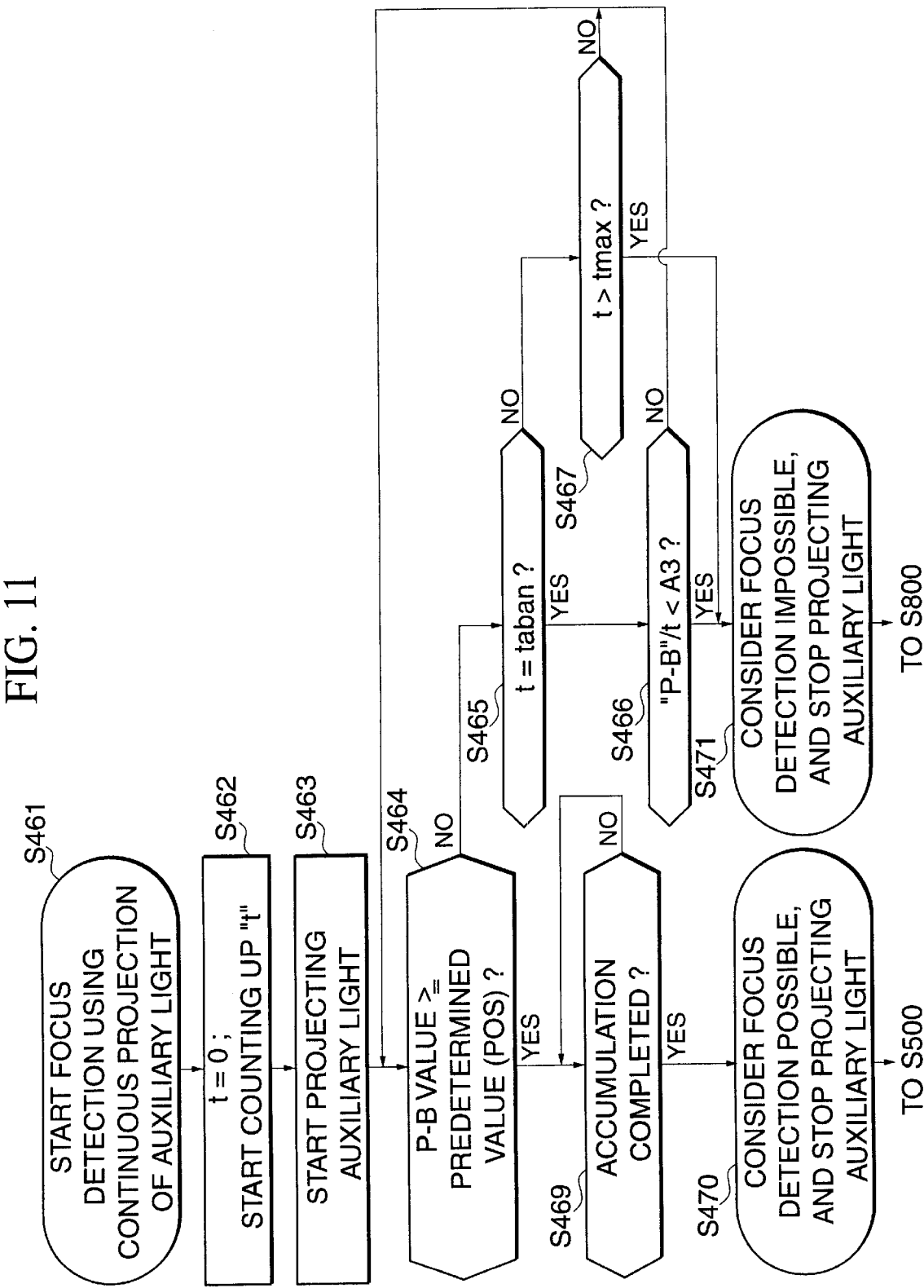
FIG. 11 is a flow chart showing the AF control operation of a camera according to a third embodiment of the invention.

When the focus detection is found impossible without auxiliary light at the step S300 of FIG. 5, the flow of operation proceeds to step S461 of FIG. 11 to start performing focus detection from step S462.

At the step S462, a timer "t" is reset and is allowed to start a time count. The timer "t" is arranged to be used for control over the length of time of illuminating an object with the auxiliary light. At the next step S463, the auxiliary light projecting lamp 28 is driven through the auxiliary light circuit 27 to project the auxiliary light toward the object of photo-taking. At step S464, the P-B signal is read out from the focus detecting sensor 4. A check is made to find if the P-B value is equal to or larger than the predetermined value POS. If so, the probability that a focus detecting arithmetic operation is possible is sufficiently high, and the flow proceeds from the step S464 to step S469. If not, the flow proceeds from the step S464 to step S465.

At the step S465, a check is made to find if the count value of the timer "t" has reached a predetermined length of time "taban". If so, the flow proceeds to step S466. In actuality, a certain period of time is required for execution of the loop of the processing steps "S464-S465-S467-S464", depending on the processing capability of the microcomputer 1. Therefore, a predetermined time "t" to be used for comparison with the count time of the timer "t" is set to include the processing time required by the microcomputer 1. If the count value of the timer "t" is not close to the predetermined time "t", the flow proceeds from the step S465 to step S467.

At the step S466, a value obtained by dividing the value of the P-B signal by the time count value of the timer "t" is compared with a halfway decision value A3. If the value is found to be less than the halfway decision value A3, focus detection is considered to be impossible, and the flow proceeds to step S471 to stop the auxiliary light from being projected. If the value obtained by dividing the value of the P-B signal by the time count value "t" is found to be equal to or larger than the halfway decision value A3, there still remains some probability that the focus detection is possible and, therefore, the flow proceeds from the step S466 to step S464 to continue the process of illuminating the object with the auxiliary light. With regard to the halfway decision value A3, it is considered to be theoretically adequate to obtain the halfway decision value A3 by dividing the predetermined value POS by a prescribed value that corresponds to the maximum time count value "tmax" of the timer "t". In actuality, however, the halfway decision value A3 is decided through experiments by taking into consideration such noises that likely enter the circuits and the focus detecting sensor of the camera.

At the step S467, a check is made to find if the length of time of illuminating the object with the auxiliary light has come to exceed the prescribed value "tmax". If so, the flow proceeds from the step S467 to step S471. The result of the check at the step S467 indicates that the P-B signal would not be obtained in a sufficient amount even by illuminating the object with the auxiliary light for the prescribed length of time "tmax". Such a result of check is rarely obtained with the flow of operation arranged to compare the P-B value with the predetermined value POS halfway in process of illuminating the object with the auxiliary light and to stop illuminating according to the result of the halfway check, as in the third embodiment. However, the step S467 is provided against some unexpected occasion.

In a case where the flow proceeds to the step S469, a check is made for the end of the process of accumulation. If the process is found to be finished thus indicating that the focus detection is possible, the illumination with the auxiliary light is brought to a stop, and the flow proceeds to step S470. At the step S470, since the focus detection is possible, the flow proceeds to the step S500 of FIG. 5. At the step S471, since the focus detection is found to be impossible, the illumination with the auxiliary light is brought to a stop, and the flow is allowed to proceed to the step S800 of FIG. 5 to let the user know that the focus detection is impossible.

Figure 12:
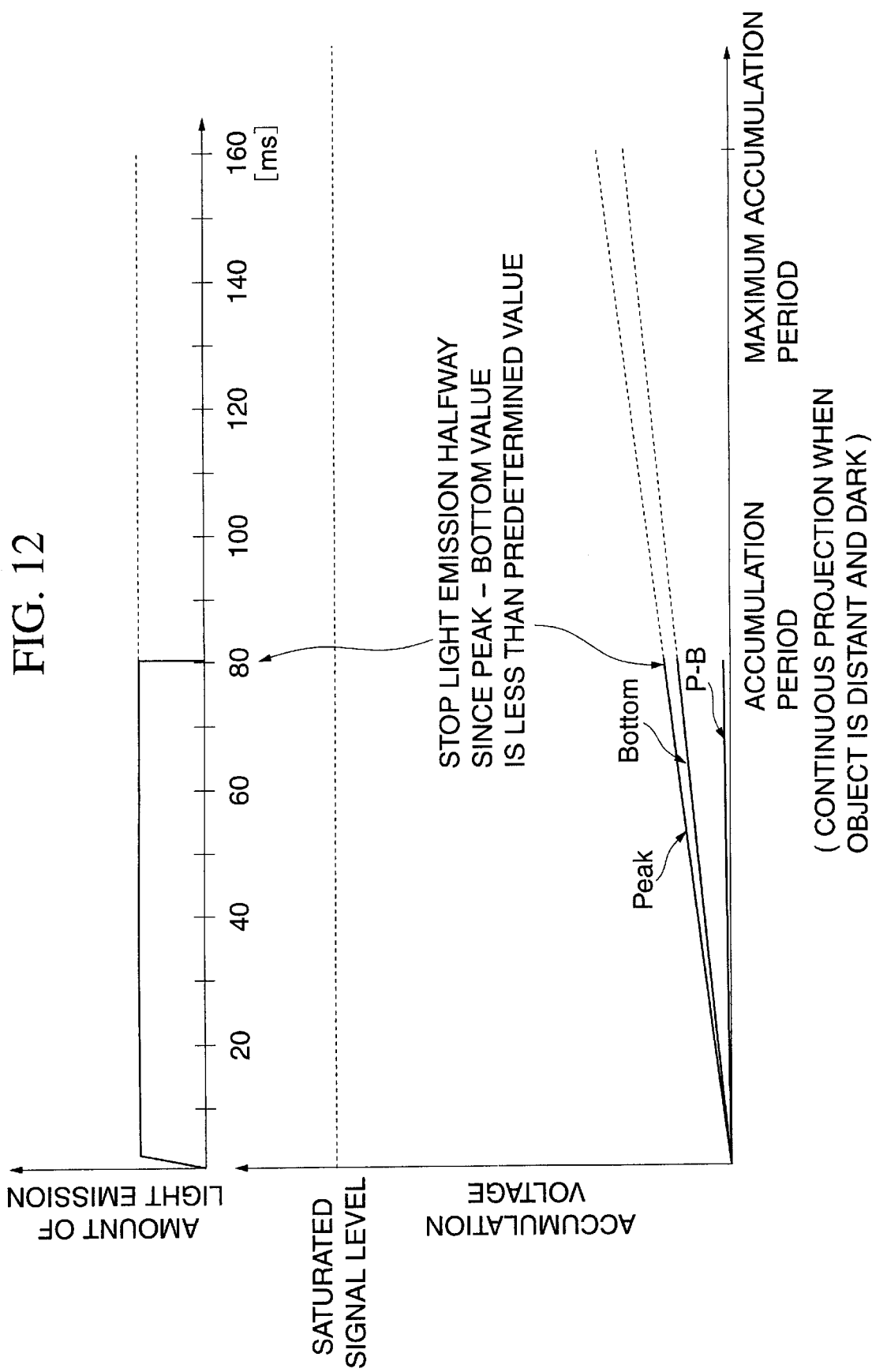
FIG. 12 is a diagram showing by way of example an illumination light amount obtained in illuminating an object with auxiliary light in relation to the output of the focus detecting device in the third embodiment.
Figure 13:
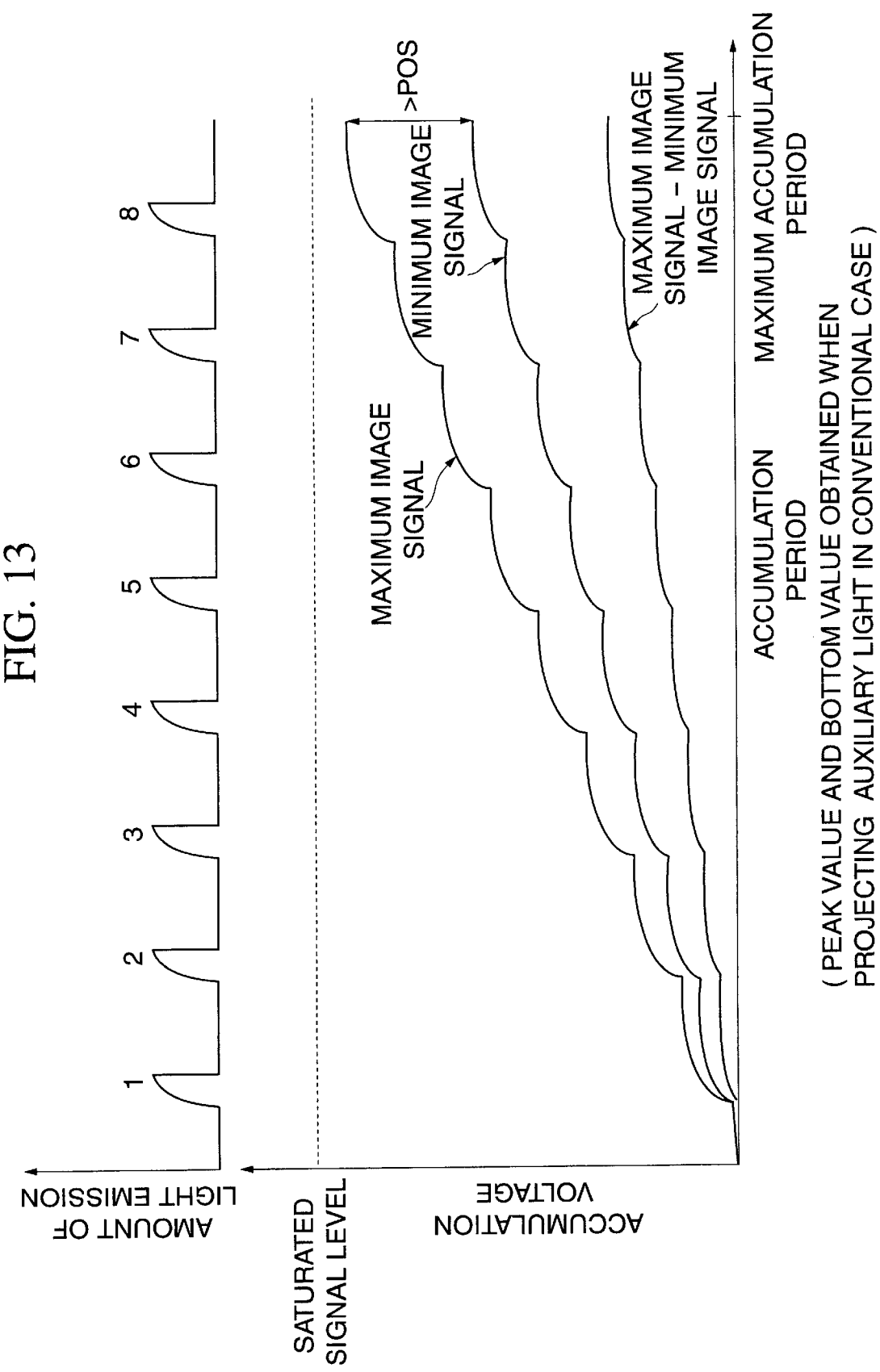
FIG. 13 is a diagram showing by way of example an illumination light amount obtained in illuminating an object with auxiliary light in relation to the output of a focus detecting device arranged in a conventional manner.
Figure 14:
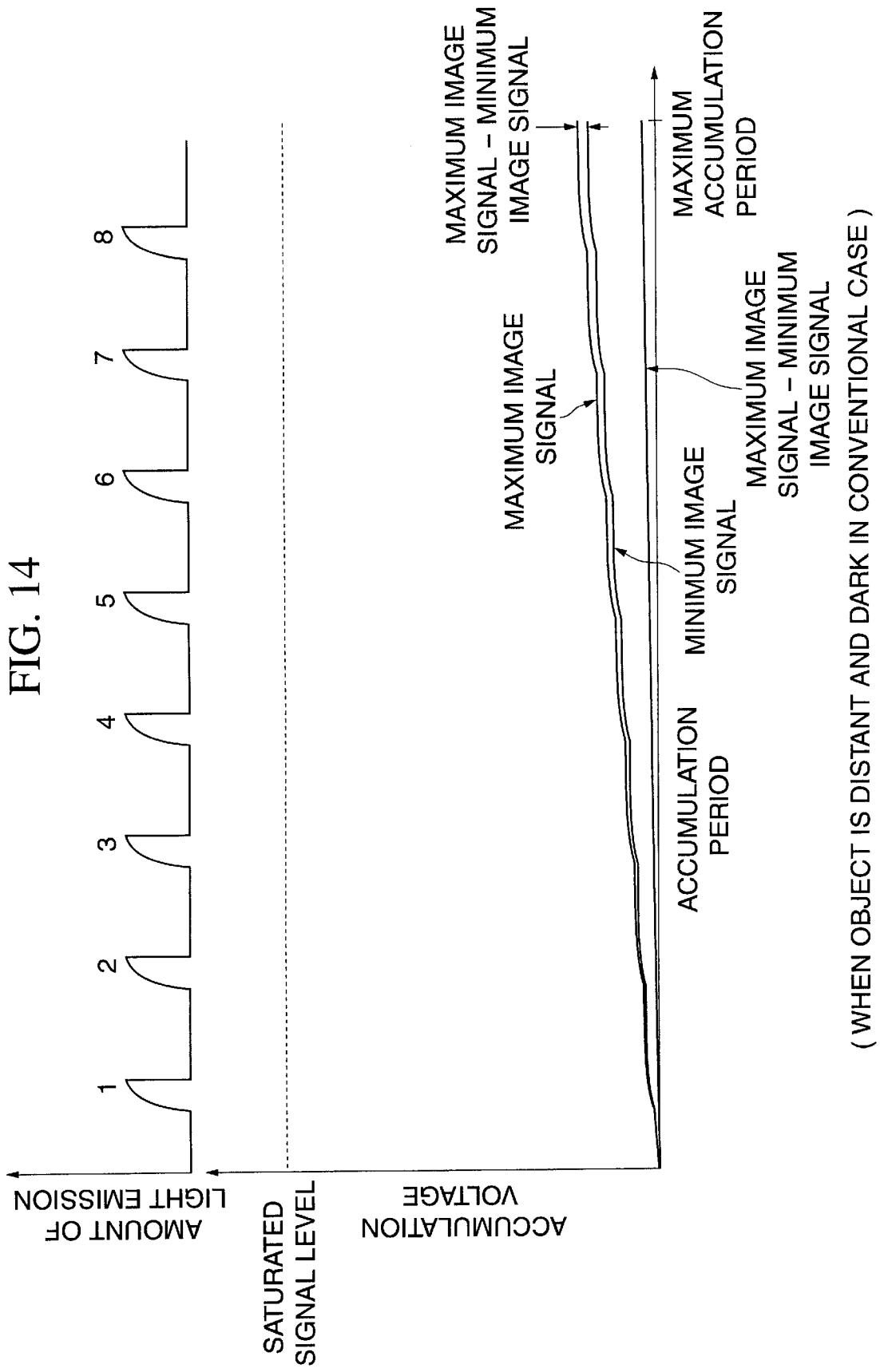
FIG. 14 shows another example of the illumination light amount obtained in illuminating an object with auxiliary light in relation to the output of the conventional focus detecting device.

FIG. 12 shows a case where illumination with the auxiliary light is stopped halfway as the object of photo-taking is dark and located at a far distance.

The camera described here is arranged to have the prescribed (maximum time) value "tmax" which corresponds to the maximum count value of the timer "t" set at 160 ms, while the predetermined time "taban" of comparing the P-B value with the predetermined value POS is set at 75 ms. The length of time required by the processing capability of the microcomputer 1 in executing the loop of steps S464-S465-S467-S464 is set at 5 ms. If the predetermined length of time "taban" is short, a great energy saving effect can be attained in the event of stopping the illuminating process halfway, because the decision can be made while the amount of illuminating light projected is still small. On the other hand, the results of tests indicate that, if the time value "taban" is short, the signal cannot be obtained in sufficient amount for making accurate decision due to the adverse effect of noises, etc. Therefore, the predetermined time "taban" should be decided on the basis of experience in designing the camera according to the purpose for which the camera is adapted.

With the auxiliary light projected only for the predetermined time "taban", which is 75 ms, if the P-B value is found at the step S464 to be less than the predetermined value POS, the flow proceeds to the step S465. Then, since t=taban, the flow proceeds from the step S465 to the step S466. At the step S466, with a value obtained by dividing the P-B signal by the value "t" (3) found to be less the halfway decision value A3, it is judged that the P-B signal would not reach the value POS even if the illumination with the auxiliary light is allowed to continue further for the maximum time "tmax". The focus detection is thus decided to be impossible, and the flow proceeds to the step S471 to stop illuminating the object with the auxiliary light any further. In this instance, however, the illumination with the auxiliary light is terminated after the lapse of time "t=80 ms" by taking into consideration the arithmetic operation time required by the processing capability of the microcomputer 1.

According to the arrangement of each of the embodiments described above, the process of illuminating the object with the auxiliary light can be brought to an end halfway of the process when the illumination with the auxiliary light is found to be not effective. Therefore, in cases where focus detection is impossible, waste of energy due to ineffective and useless illumination with the auxiliary light can be minimized. The battery energy capacity required for a portable apparatus such as a camera arranged to be driven with a battery, therefore, can be lessened for reduction in size of the apparatus.

It is another advantage of the invention that, since the flash auxiliary light is annoyingly perceivable by human eyes and thus gives a disagreeable impression to people around the camera, the minimization of use of the flash auxiliary light enhances the quality of the camera or the like.

(Modification Examples)

In each of the embodiments described above, the invention is applied by way of example to the focus detecting device for a camera. However, the invention is applicable also to focus detecting devices for apparatuses other than cameras.

Further, while the focus detecting device in each embodiment has been described as arranged to have one AF (automatic focusing) point, the invention is likewise applicable to a focus detecting device having a plurality of AF points.

Further, while, in each of the embodiments described above, the built-in flash device 26 or the built-in auxiliary light projecting lamp 28 is used as an auxiliary light means, an externally-attached flash device or an externally-attached auxiliary light projecting lamp may be used.

According to the arrangement of each of the first, second and third embodiments of the invention described above, a focus detecting device or a focus detecting device for a camera can be arranged to bring the process of illuminating the object with the auxiliary light to a stop halfway through the process in cases where the amount of reflection light obtainable by illuminating the object with the auxiliary light is small, or where the contrast of the object is too low for focus detection, so that waste of energy by the ineffective use of auxiliary light can be minimized.

What is claimed is:

1. A focus detecting device, comprising:
   a light receiving device which receives reflection light from an object of focus detection;
   an auxiliary light device which illuminates the object of focus detection with auxiliary light; and
   a control circuit which controls an illuminating action of said auxiliary light device and performs focus detection on the basis of a received-light signal output of said light receiving device,
   wherein, while said auxiliary light device is in process of being controlled to illuminate the object of focus detection, said control circuit compares the received-light signal output of said light receiving device with a prescribed value and causes the focus detection being made by controlling said auxiliary light device to stop if the received-light signal output is less than the prescribed value.

2. A focus detecting device according to claim 1, wherein said light receiving device has a function of outputting a maximum value of the received-light signal output, and said control circuit compares the maximum value of the received-light signal output with the prescribed value and causes the focus detection being made by controlling said auxiliary light device to stop if the maximum value is less than the prescribed value.

3. A focus detecting device according to claim 1, wherein said light receiving device has a function of outputting a maximum value and a minimum value of the received-light signal output, and said control circuit compares a difference output indicative of a difference between the maximum value and the minimum value of the received-light signal output with the prescribed value and causes the focus detection being made by controlling said auxiliary light device to stop if the difference output is less than the prescribed value.

4. A focus detecting device according to claim 1, wherein said control circuit causes the focus detection being made by controlling said auxiliary light device to stop if the received-light signal output is less than the prescribed value after said auxiliary light device has performed the illuminating action just a predetermined number of times.

5. A focus detecting device according to claim 1, wherein said control circuit causes the focus detection being made by controlling said auxiliary light device to stop if the received-light signal output is less than the prescribed value after said auxiliary light device has performed the illuminating action just for a predetermined period of time.

6. A focus detecting device according to claim 1, wherein said auxiliary light device intermittently illuminates the object of focus detection with the auxiliary light.

7. A focus detecting device according to claim 1, wherein said auxiliary light device illuminates the object of focus detection with the auxiliary light in a manner of having a pattern.

8. A focus detecting device according to claim 1, wherein said auxiliary light device continuously illuminates the object of focus detection with the auxiliary light.

9. A focus detecting device according to claim 1, wherein said light receiving device is a pair of sensors.

10. A focus detecting device, comprising:
    a light receiving device which receives reflection light from an object of focus detection;
    an auxiliary light device which illuminates the object of focus detection with auxiliary light; and
    a control circuit which controls an illuminating action of said auxiliary light device and performs focus detection on the basis of a received-light signal output of said light receiving device,
    wherein, while said auxiliary light device is in process of being controlled to illuminate the object of focus detection, said control circuit compares the received-light signal output of said light receiving device with a prescribed value and causes the illuminating action of said auxiliary light device to stop if the received-light signal output is less than the prescribed value.

11. A focus detecting device according to claim 10, wherein said light receiving device has a function of outputting a maximum value of the received-light signal output, and said control circuit compares the maximum value of the received-light signal output with the prescribed value and causes the illuminating action of said auxiliary light device to stop if the maximum value is less than the prescribed value.

12. A focus detecting device according to claim 10, wherein said light receiving device has a function of outputting a maximum value and a minimum value of the received-light signal output, and said control circuit compares a difference output indicative of a difference between the maximum value and the minimum value of the received-light signal output with the prescribed value and causes the illuminating action of said auxiliary light device to stop if the difference output is less than the prescribed value.

13. A focus detecting device for a camera, comprising:
    a light receiving device which receives reflection light from an object of photo-taking;
    an auxiliary light device which illuminates the object of photo-taking with auxiliary light; and
    a control circuit which controls an illuminating action of said auxiliary light device and performs focus detection on the basis of a received-light signal output of said light receiving device,
    wherein, while said auxiliary light device is in process of being controlled to illuminate the object of photo-taking, said control circuit compares the received-light signal output of said light receiving device with a prescribed value and causes the focus detection being made by controlling said auxiliary light device to stop if the received-light signal output is less than the prescribed value.

14. A focus detecting device for a camera, according to claim 13, wherein said light receiving device has a function of outputting a maximum value of the received-light signal output, and said control circuit compares the maximum value of the received-light signal output with the prescribed value and causes the focus detection being made by controlling said auxiliary light device to stop if the maximum value is less than the prescribed value.

15. A focus detecting device for a camera, according to claim 13, wherein said light receiving device has a function of outputting a maximum value and a minimum value of the received-light signal output, and said control circuit compares a difference output indicative of a difference between the maximum value and the minimum value of the received-light signal output with the prescribed value and causes the focus detection being made by controlling said auxiliary light device to stop if the difference output is less than the prescribed value.

16. A focus detecting device for a camera, according to claim 13, wherein said control circuit causes the focus detection being made by controlling said auxiliary light device to stop if the received-light signal output is less than the prescribed value after said auxiliary light device has performed the illuminating action just a predetermined number of times.

17. A focus detecting device for a camera, according to claim 13, wherein said control circuit causes the focus detection being made by controlling said auxiliary light device to stop if the received-light signal output is less than the prescribed value after said auxiliary light device has performed the illuminating action just for a predetermined period of time.

18. A focus detecting device for a camera, according to claim 13, wherein said auxiliary light device intermittently illuminates the object of photo-taking with the auxiliary light.

19. A focus detecting device for a camera, according to claim 13, wherein said auxiliary light device illuminates the object of photo-taking with the auxiliary light in a manner of having a pattern.

20. A focus detecting device for a camera, according to claim 13, wherein said auxiliary light device continuously illuminates the object of photo-taking with the auxiliary light.

21. A focus detecting device for a camera, according to claim 13, wherein said auxiliary light device is a flash device incorporated into said camera.

22. A focus detecting device for a camera, according to claim 13, wherein said auxiliary light device is a flash device externally attached to said camera.

23. A focus detecting device for a camera, according to claim 13, wherein said light receiving device is a pair of sensors.

24. A focus detecting device for a camera, comprising:
a light receiving device which receives reflection light from an object of photo-taking;
an auxiliary light device which illuminates the object of photo-taking with auxiliary light; and
a control circuit which controls an illuminating action of said auxiliary light device and performs focus detection on the basis of a received-light signal output of said light receiving device,
wherein, while said auxiliary light device is in process of being controlled to illuminate the object of photo-taking, said control circuit compares the received-light signal output of said light receiving device with a prescribed value and causes the illuminating action of said auxiliary light device to stop if the received-light signal output is less than the prescribed value.

25. A focus detecting device for a camera, according to claim 24, wherein said light receiving device has a function of outputting a maximum value of the received-light signal output, and said control circuit compares the maximum value of the received-light signal output with the prescribed value and causes the illuminating action of said auxiliary light device to stop if the maximum value is less than the prescribed value.

26. A focus detecting device for a camera, according to claim 24, wherein said light receiving device has a function of outputting a maximum value and a minimum value of the received-light signal output, and said control circuit compares a difference output indicative of a difference between the maximum value and the minimum value of the received-light signal output with the prescribed value and causes the illuminating action of said auxiliary light device to stop if the difference output is less than the prescribed value.

* * * * *

UNITED STATES PATENT AND TRADEMARK OFFICE
CERTIFICATE OF CORRECTION

PATENT NO. : 6,424,808 B2
DATED : July 23, 2002
INVENTOR(S) : Nobuyuki Furukawa

It is certified that error appears in the above-identified patent and that said Letters Patent is hereby corrected as shown below:

Column 12,
Line 20, "less" should read -- less than --.

Signed and Sealed this

Thirty-first Day of December, 2002

JAMES E. ROGAN
*Director of the United States Patent and Trademark Office*